(12) United States Patent (10) Patent No.: US 9,198,444 B2
Fernandez et al. (45) Date of Patent: Dec. 1, 2015

(54) DEVICE FOR CONTROLLING THE GAS MEDIUM INSIDE A CONTAINER

(75) Inventors: Raul Fernandez, Weston, FL (US); Pat Foster, Tamarac, FL (US); Carlos Beltran, Hialeah Gardens, FL (US); Julio Urquiaga, Miami, FL (US)

(73) Assignee: Chiquita Brands, Inc., Charlotte, NC (US)

( * ) Notice: Subject to any disclaimer, the term of this patent is extended or adjusted under 35 U.S.C. 154(b) by 1468 days.

(21) Appl. No.: 11/427,201

(22) Filed: Jun. 28, 2006

(65) Prior Publication Data

US 2007/0144638 A1 Jun. 28, 2007

Related U.S. Application Data

(60) Provisional application No. 60/697,722, filed on Jul. 8, 2005.

(51) Int. Cl.
*A23B 7/152* (2006.01)
*A23B 7/00* (2006.01)
*A23L 3/3445* (2006.01)

(52) U.S. Cl.
CPC . *A23B 7/00* (2013.01); *A23B 7/152* (2013.01); *A23L 3/3445* (2013.01); *A23V 2002/00* (2013.01)

(58) Field of Classification Search
CPC .............. A23B 7/152; A23V 2002/00; A23V 2200/10; A23V 2250/126; A23V 2250/11; F25D 11/003; B65D 5/4295
USPC ................ 99/467, 472, 473, 356; 222/3, 399; 428/34.7; 53/432, 510, 440; 34/443, 34/467, 90, 210, 218, 242, 62, 480; 422/9, 422/10, 292, 306; 165/48.1; 62/78, 96, 239, 62/274, 405, 406, 417, 440
See application file for complete search history.

(56) References Cited

U.S. PATENT DOCUMENTS

| 1,817,875 | A | * | 8/1931 | Broadbent | .................... | 426/419 |
|---|---|---|---|---|---|---|
| 3,040,966 | A | * | 6/1962 | Crane | ........................... | 383/103 |
| 3,097,787 | A | * | 7/1963 | Schur | ............................. | 383/94 |
| 3,245,606 | A | * | 4/1966 | Crane | ........................... | 383/103 |
| 3,436,231 | A | * | 4/1969 | Britt et al. | ...................... | 426/132 |
| 3,982,584 | A | * | 9/1976 | Spanoudis | ....................... | 165/42 |
| 4,503,561 | A | * | 3/1985 | Bruno | ........................... | 383/102 |
| 4,919,955 | A | * | 4/1990 | Mitchell | ........................ | 426/394 |
| 5,032,619 | A | * | 7/1991 | Frutin et al. | .................... | 521/55 |
| 5,102,627 | A | * | 4/1992 | Plester | ........................... | 422/112 |
| 5,152,966 | A | * | 10/1992 | Roe et al. | ........................ | 422/111 |
| 5,188,257 | A | * | 2/1993 | Plester | ............................. | 222/1 |

(Continued)

FOREIGN PATENT DOCUMENTS

EP 0282180 A2 * 9/1988

*Primary Examiner* — Reginald L Alexander
(74) *Attorney, Agent, or Firm* — Frost Brown Todd LLC

(57) ABSTRACT

A device for controlling the composition inside a shipping/storage container for produce, such as bananas, is disclosed. Such atmospheric control is particularly important when dealing with the ripening of respiring fruit. The device comprises a chamber surrounded by an outer wall, at least a portion of that wall made up of a selectively gas-permeable membrane which is in communication with the outside atmosphere. The chamber also includes at least two channels which are connected to the container: one which transmits gas form the chamber to the container, and one which transmits gas from the container to the chamber.

13 Claims, 2 Drawing Sheets

(56) References Cited

U.S. PATENT DOCUMENTS

| | | | |
|---|---|---|---|
| 5,281,401 A * | 1/1994 | Bryson, Sr. | 422/305 |
| 5,316,178 A * | 5/1994 | Garber, Jr. | 222/3 |
| 5,318,789 A * | 6/1994 | Nakagawa et al. | 426/316 |
| 5,319,941 A * | 6/1994 | Schilling | 62/89 |
| 5,333,394 A * | 8/1994 | Herdeman et al. | 34/467 |
| 5,355,781 A * | 10/1994 | Liston et al. | 99/476 |
| 5,361,683 A * | 11/1994 | Silvestrini et al. | 99/356 |
| 5,377,502 A * | 1/1995 | Collins et al. | 62/304 |
| 5,419,153 A * | 5/1995 | Hartley | 62/408 |
| 5,437,837 A * | 8/1995 | Olson et al. | 422/3 |
| 5,475,926 A * | 12/1995 | Bolkestein et al. | 34/200 |
| 5,570,628 A * | 11/1996 | Kiener et al. | 99/472 |
| 5,706,662 A * | 1/1998 | Van | 62/89 |
| 5,771,790 A * | 6/1998 | Barrows | 99/476 |
| 5,872,721 A * | 2/1999 | Huston et al. | 702/24 |
| 5,960,708 A * | 10/1999 | DeTemple et al. | 99/472 |
| 6,013,293 A * | 1/2000 | De Moor | 426/106 |
| 6,092,430 A * | 7/2000 | Liston et al. | 73/863.81 |
| 6,230,614 B1 * | 5/2001 | Del Gallo et al. | 99/467 |
| 6,256,905 B1 * | 7/2001 | White | 34/467 |
| 6,376,032 B1 * | 4/2002 | Clarke et al. | 428/34.7 |
| 6,431,060 B1 * | 8/2002 | Gutheim | 99/475 |
| 6,499,632 B2 * | 12/2002 | van't Hoff | 222/389 |
| 6,536,133 B1 * | 3/2003 | Snaper | 34/265 |
| 6,548,132 B1 * | 4/2003 | Clarke et al. | 428/34.7 |
| 6,615,908 B1 * | 9/2003 | Bosher et al. | 165/48.1 |
| 6,823,774 B2 * | 11/2004 | Uranaka et al. | 99/467 |
| 6,884,392 B2 * | 4/2005 | Malkin et al. | 422/26 |
| 6,923,111 B2 * | 8/2005 | Kiefer et al. | 99/468 |
| 6,979,428 B2 * | 12/2005 | Jethrow et al. | 422/292 |
| 6,984,359 B2 * | 1/2006 | Florkey et al. | 422/3 |
| 6,988,325 B2 * | 1/2006 | Philippe et al. | 34/191 |
| 7,022,283 B2 * | 4/2006 | McGuire et al. | 422/40 |
| 7,807,100 B2 * | 10/2010 | Choperena et al. | 422/1 |
| 2003/0182900 A1 * | 10/2003 | Bowden et al. | 53/432 |
| 2003/0185948 A1 * | 10/2003 | Garwood | 426/392 |
| 2004/0001774 A1 * | 1/2004 | Williams et al. | 422/29 |
| 2004/0035553 A1 * | 2/2004 | Bosher et al. | 165/48.1 |
| 2005/0056158 A1 * | 3/2005 | Chiang et al. | 99/467 |
| 2005/0153028 A1 * | 7/2005 | DelDuca et al. | 426/124 |
| 2005/0161362 A1 * | 7/2005 | Machado | 206/484.1 |
| 2005/0210699 A1 * | 9/2005 | Philippe et al. | 34/191 |
| 2006/0017182 A1 * | 1/2006 | Newman et al. | 261/78.2 |
| 2006/0078459 A1 * | 4/2006 | Kohler et al. | 422/3 |
| 2006/0121167 A1 * | 6/2006 | Roman | 426/415 |
| 2009/0324445 A1 * | 12/2009 | Kohler et al. | 422/33 |

\* cited by examiner

DEVICE FOR CONTROLLING THE GAS MEDIUM INSIDE A CONTAINER

This application is based upon and claims priority from U.S. Provisional Patent Application No. 60/697,722, Fernandez et al., filed Jul. 8, 2005, incorporated herein by reference.

FIELD OF THE INVENTION

The invention is related to container shipping and storage of produce, in particular, to the means for controlling the gas composition in such containers.

BACKGROUND OF THE INVENTION

Transfer of fruits in shipping containers necessitates a certain composition of a gas medium inside the container. That composition should change depending upon the type of fruits, the degree of their ripeness, and the technology for preparation of these fruits for sale.

There are known inventions related to the systems for controlling gas media in shipping containers.

U.S. Pat. No. 5,333,394, "Controlled atmosphere container system for perishable products", Herdeman, et al., issued Aug. 2, 1994, includes a description of a system that is connected to the inlet connecting pipe of the container, allowing control of the gas medium inside it. The system includes the central source of the gas medium, which is connected through pipes and channels to a number of containers into which the required gas medium is pumped.

U.S. Pat. No. 6,092,430, "Oxygen/carbon dioxide sensor and controller for a refrigerated controlled atmosphere shipping container", Liston, et al, issued Jul. 25, 2000, includes a description of a device for controlling a gas medium in a container intended for shipping of perishable products, in particular, fruits. The device includes an inlet connecting pipe, intended for the intake of atmospheric air, which is first cleaned from dust and moisture. Then, using a compressor, the air is passed through a nitrogen-permeable membrane filter. The separated nitrogen is further directed inside the container. The device is also equipped with a vessel with carbon dioxide, and with a system for feeding carbon dioxide into the container. The container is equipped with a system for controlling carbon dioxide and oxygen content in the gas medium, and for pumping nitrogen into the container.

U.S. Pat. No. 6,615,908, "Method of transporting or storing perishable product", Bosher, et al., issued Sep. 9, 2003, includes a description of a device for controlling the gas medium inside a container. The device includes a diffusion membrane through which atmospheric air is pulled into the container. The membrane conducts carbon dioxide, and does not conduct oxygen. The gas medium in the container is modified by releasing parts of it from the container through a release valve, and by substituting it for gas that has passed through the above-mentioned membrane.

Existing devices for regulation of gas media in containers involve complicated equipment. They also require significant energy consumption for passing atmospheric air through filters, and for generating excessive pressure inside the container necessary to release the gas medium being substituted through the outlet valves.

SUMMARY OF THE INVENTION

The device described here achieves the required composition of the gas medium in a container for shipping and storage of produce—in particular, bananas—and constitutes a simple structure consuming a relatively small amount of energy.

The device consists of a gas exchange chamber, the inner space of which is connected to the inner space of the container through at least two channels. One of the channels is intended for intake of the gas medium from the container, while another is intended for the return of the modified gas medium back into the container. The inner space of the chamber is also connected with the external atmosphere via a gas-permeable membrane.

The gas medium (from the shipping/storage container) enters the inner space of the chamber through the intake channel. Due to the presence of the above-mentioned gas-permeable membrane, the gas exchange between the gas medium of the chamber and the external atmosphere occurs inside the inner space of the chamber. The nature of the gas exchange is predetermined by the selective features of the gas membrane (different permeability with different gases). Thus, the modification of composition of gas staying in the chamber will be achieved. The gas medium of the container mixes with the gas medium of the chamber. Modified gas from the chamber returns to the container through the channel for return of modified gas medium. As a result, new portions of the gas medium are continuously fed into the inner space of the chamber from the container. The gas medium from the container can pass through the gas exchange chamber several times, until the gas medium from the container is modified in such a way that it attains the required composition (ratio of gases).

Such a gas exchange process can be used to maintain a consistent composition of a gas medium in a container when, due to biological processes of the stored produce (e.g., respiration, ripening), the composition of the gas medium inside the container changes. Thus, to store bananas and to avoid their early ripening, it is necessary to maintain a reduced oxygen/increased $CO_2$ gas medium (as compared to ambient air) inside the container. However, bananas respire during storage (take in oxygen and release $CO_2$), which modifies the required conditions for storing them. In this case, the described device can be used for maintenance of a constant ratio of concentration of oxygen and $CO_2$ inside the container. This is achieved by feeding oxygen from ambient air through a gas-permeable membrane, into the inner space of the gas exchange chamber, and feeding the $CO_2$ from the gas exchange chamber through the membrane, into the ambient air. Determining a definite ratio of membrane permeability for $CO_2$ and oxygen allows (due to the gas exchange developing in the chamber) to compensate for the modification of composition of the gas medium inside the container caused by banana respiration. As a result, it is possible to maintain the required ratio of oxygen and $CO_2$ in the gas medium inside the container.

The required rate for changing the gas medium inside the container can be achieved in different ways: for example, based upon the volume of the inner chamber and the surface area of the gas-permeable membrane and/or control of the flow rate in the intake channels and/or return of the gas medium.

Switching the device on and off, as well as controlling its operation modes, can be performed by regulating the cross-section of channels of intake and return of the gas medium, for example, using shutters or valves.

The device can be a separate gas exchange chamber, which has pipe connections intended for connecting the chamber to the container, for example, using hoses. The device can be used with a standard shipping container having two pipe connections. One connection serves for uptake of the gas medium from the container, the other serves to return the modified gas medium. The inner space of the gas exchange chamber is connected to the container's pipe connections, via hoses. The flow of the gas medium through the chamber is caused by a fan, which is usually provided in a container for circulating the gas medium inside it. Part of the gas medium will flow through the uptake pipe connection from the container, into the inner space of the chamber. The modified gas medium will be fed into the container through another pipe connection.

Such a device for gas medium control with one gas exchange chamber can serve several containers.

To intensify the rate of gas exchange, chargers (for example, fans) can be built into the uptake and return channels of the gas medium.

The device can also be a unit connected to the shipping container. In this case, the design should connect the gas chamber in such a way that the uptake channel and the return channel are connected to the corresponding pipe connections of container.

In another alternative, the device can be part of the actual shipping container, as a separate section equipped with corresponding channels intended for gas uptake and return. This section would be connected to the ambient atmosphere through the selectively gas-permeable membrane.

Valves can be installed at the inlet and outlet of the uptake channel and the return channel; the valves can be controlled by a sensor-based system that would determine the composition of the gas medium inside the container, and modify the gas flow accordingly to meet defined atmospheric compositions.

In any design alternative of the device, the gas exchange chamber can have an additional inlet channel for feeding gases into the inner space of the chamber (gases required for storage of produce, such as ethylene, for example).

The above description of the gas exchange chamber is not exhaustive. For example, the device can also be a separate gas exchange channel, the wall of which contains a selective gas-permeable membrane. Due to the presence of the membrane, the gas exchange between the gas medium moving inside the channel along the membrane and ambient atmosphere, will occur inside the channel. The channel can vary in shape depending on the needed level of compactness and length. The required rate for modification of the gas medium inside the container can be achieved in different ways: selection of the length of the channel and the surface area of the selectively gas-permeable membrane, control of the flow rate in the uptake and return channels. The connection of the device to the container is similar to that for a gas exchange chamber.

Specifically, the present invention relates to a device for providing the required composition of gas medium in a container for shipping and/or storage of produce, comprising a chamber surrounded by an outer wall, at least a portion of said wall made up of a selectively gas-permeable membrane which is in communication with the outside atmosphere, and at least two channels (which are capable of being connected to the produce container), one of which acts to transmit gases from the chamber to the container, and one of which acts to transmit gases from the container to the chamber.

In another embodiment, the present invention relates to a method for providing a defined composition for the gas medium in a container for shipping and/or storage of produce using the device defined above, comprising the steps of: measuring the composition of the gas medium in the container; comparing the measured composition against the defined composition (target) of the gas medium; controlling the flow of gases from the chamber to the container and/or from the container to the chamber; and repeating the measuring, comparing and controlling steps until the measured composition in the container matches the defined composition.

DETAILED DESCRIPTION OF THE INVENTION

Figure 1:
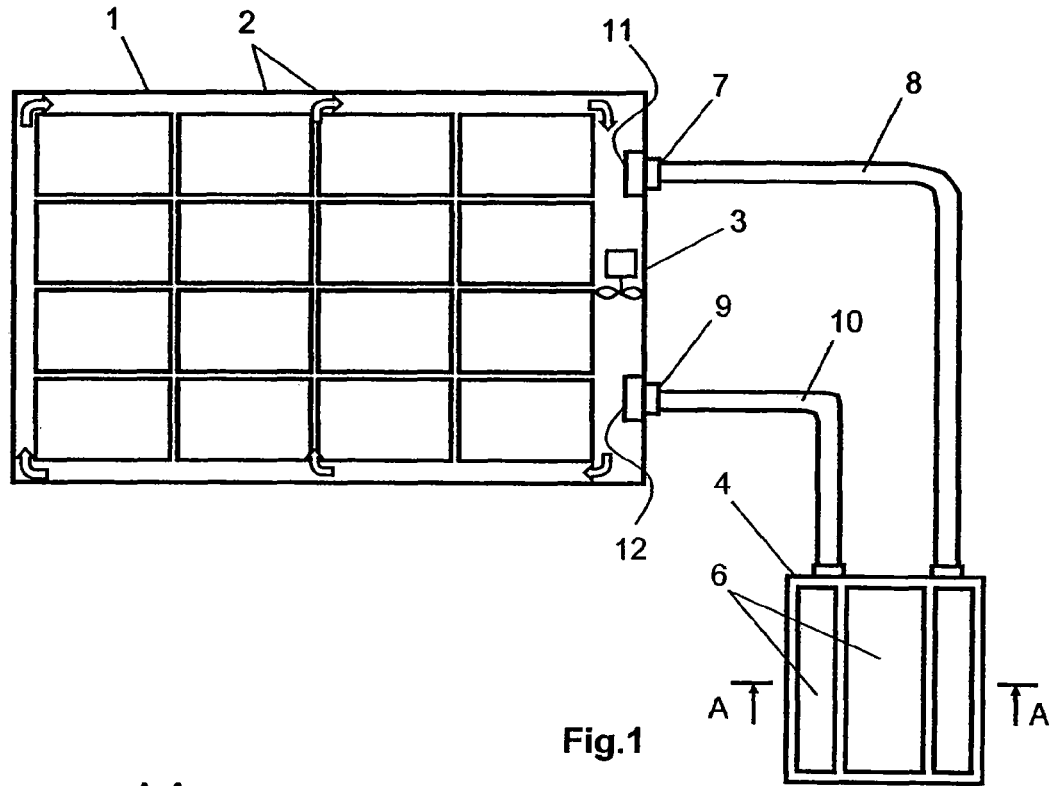
FIG. 1 shows an example of a device for regulation of the gas medium inside a shipping/storage container, embodied as a separate gas exchange chamber connected to the container via hoses.

Container (1) (FIG. 1) contains the load, for example, in the form of packaged fruits (2). Transfer and stirring of gas medium inside the container is ensured by the charger (3). The device for control of the gas medium inside the container (1) is embodied in the form of a chamber (4) with an inner space (5) (see FIG. 2) and a gas-permeable membrane (6). The membrane separates the inner space (5) of chamber (4) from the external ambient air. A connecting pipe (7) of the container (1) and the hose (8) form a channel for uptake of the gas medium from the container (1) and for feeding it into the chamber (4). The connecting pipe (9) and the hose (10) form a channel for return of the modified gas medium from the chamber (4) to the container (1).

Valves (11 and 12) are installed on connecting pipes (7 and 9). These valves are connected to the corresponding control system (not shown in FIG. 1), containing sensors and devices controlling the operation of the valves (11, 12) and the charger (3).

The device for controlling the gas medium composition in the container (2), in the above-described design alternative, operates as follows:

To modify the gas medium, the chamber (4) is connected to connecting pipes (7 and 9) using hoses (8 and 10). Valves (11 and 12) are opened by the control system and if the charger (3) has not yet been turned on by the time, it is switched on. The gas medium from the container (1) begins to enter the inner space (5) of the chamber (4) through the connecting pipe (7) and hose (8).

The gas exchange between the gas remaining in the inner space (5) of the chamber (4) and external atmospheric air occurs via the gas-permeable membrane (6). The direction of the gas exchange is determined by the difference in concentration of gas medium components of the container (1) and external ambient air. The circulation of the gas medium of the container (1) through the chamber (4) is accompanied by its gradual modification. Valves (11 and 12) are closed when the required composition of the gas medium in the container (1) is achieved. After that, the chamber (4) can be disconnected from the container (1), or it can remain connected for further atmospheric modification, as needed.

As an example, let us consider the device as applied to shipping green bananas in the container. In this case, to prevent early ripening and spoilage of bananas, in addition to a reduced temperature (about 14° C.), it is necessary to maintain the gas medium in the container with reduced oxygen content (relative to ambient air)—about 2-4%, and increased carbon dioxide content (relative to ambient air)—about 4-7%. However, during storage, the bananas absorb oxygen and release carbon dioxide, which leads to the reduction of the oxygen content (which gets lower than the normal value) and to the increase of the carbon dioxide concentration (which gets higher than the normal value) in the container.

To maintain the required composition of the gas medium in the container, the gas-permeable membrane (6) of the chamber (4) is characterized by a ratio of permeability values of carbon dioxide and oxygen of about "4", which means that $V(CO_2)/V(O_2) \approx 4$, Taking into account the ratio of concentrations of carbon dioxide in the container and in ambient air (which, in the latter case, constitutes approximately 0.03% for carbon dioxide and approximately 21% for oxygen) based upon the above-described gas exchange in the chamber, the concentration of carbon dioxide needs to be reduced, while the oxygen concentration needs to be increased. Furthermore, gas of modified composition from the chamber (4) passes from the chamber to the container (1). This preconditions the compensation of modification of the gas medium composition in the container that is caused by banana respiration.

The absolute permeability value of the membrane (6) material can be, for example, about $1.12*10^6$ cc/100 sq.ins.atm-24 hrs for carbon dioxide. For oxygen, this value can be about $2.8*10^5$ cc/100 sq.ins.atm-24 hrs.

The indicated characteristics of the membrane (6) material allow the system to quickly achieve the required concentrations of oxygen and carbon dioxide in the container (1). It is possible to use other materials for the membrane, with the same ratio of permeability values, but with smaller absolute values of this parameter, which should be compensated for by an increase of the operating surface area of the membrane.

The device described above can serve several containers concurrently. For this purpose, the chamber (4) should be equipped with the appropriate number of input and output channels.

Figure 2:
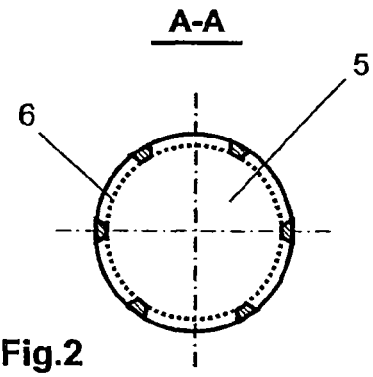
FIG. 2 shows the cross-section of chamber.
Figure 3:
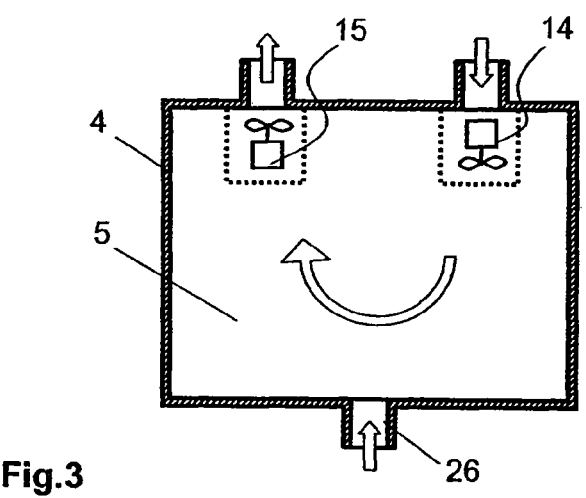
FIG. 3 shows an example of a design embodiment of the gas exchange chamber with additional chargers, and an additional inlet for inlet of gas to be mixed with the gas medium of the container.

Additionally, to enhance the entire gas exchange process, chargers (14 and 15) can be introduced into the chamber (4) (see FIG. 3), or into the channels for uptake and return (not shown in FIG. 1). These chargers would ensure the required velocity of the flow in the chamber. It is possible to use additional chargers if several containers are connected to the chamber; however, they can be used only when the container is serviced.

The rate of gas medium modification in the chamber depends upon the volume of the chamber, surface area and permeability of the membrane (6), and the flow rate into and out of the container. Velocity of flow through the chamber is regulated depending upon the velocity of the gas exchange and upon the required rate for substitution of the gas medium in the container (1).

Control of the gas composition of the atmosphere inside the container (1) can require an additional gas, for example, ethylene. In this case (see FIG. 3), an additional input with a connecting pipe (26) is executed, intended for feeding in gas from an external gas storage device or from a gas generator.

Figure 4:
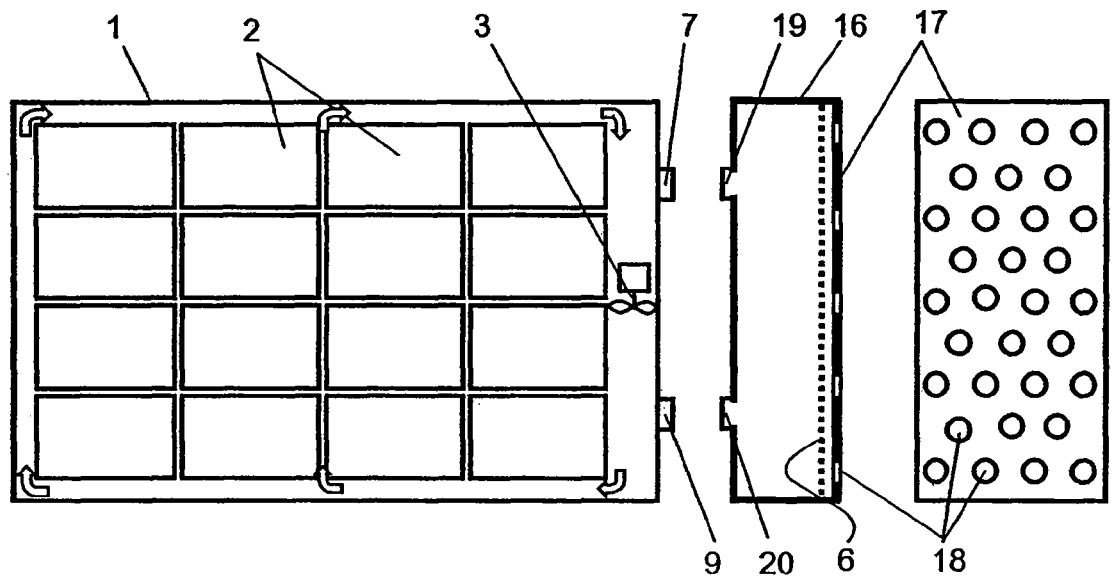
FIG. 4 shows an example of a device, embodied as a section connected to the main container.

In another example of the device (see FIG. 4), the gas exchange chamber is a section (16) that is connected to the container (1) from the side of the connecting pipes (7 and 9). The gas-permeable membrane (6) is installed in the section (16), and is protected by the wall (17). The membrane has orifices (18) intended for ensuring contact of the membrane's surface with ambient air. Channels for uptake of the gas medium from the container and for the return of the modified gas medium are executed as connection pipes (19 and 20) of the section (16), correspondingly.

The section (16) is connected to the container to ensure a hermetically sealed connection of pipes of the container, to the connecting pipes (19 and 20) of the section. The device functions in a manner similar to that of the device presented in FIG. 1, and described above.

Figure 5:
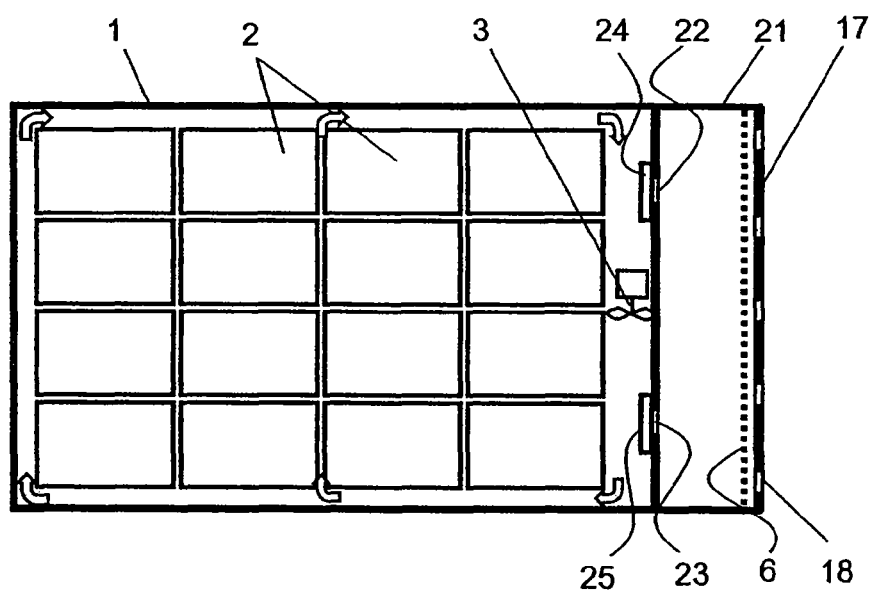
FIG. 5 shows an example of a device, embodied jointly with the container as a separate section.

Also, the device described here can be a separate section (21) of the container (1), as shown in FIG. 5. In this case, the section (21), constituting a gas exchange chamber, appears, for example, in the form of an enclosure constituting a separate part of the container. The section (21) is connected with the cargo part of the container via channels in the form of orifices (22 and 23), blocked by controlled shutters or valves (24 and 25), correspondingly.

What is claimed is:

1. A device for providing the required composition of gas medium in a container for shipping and storage of produce, said device separate from and located outside said container and consisting essentially of a chamber surrounded by an outer wall, a portion of said outer wall made up of a selectively gas-permeable membrane which is in direct communication with the atmosphere which surrounds both the device and the container for shipping and storage of produce, wherein said membrane controls the identity and ratio of gases passing through it from said atmosphere into the chamber, and the contents of said chamber being at substantially atmospheric pressure, and at least two channels, which are structurally adapted such that they can be removably attached to said container, one of which acts to transmit gases from the chamber to the container, and one of which acts to transmit gases from the container to the chamber.

2. The device, according to claim 1 which includes valves in one or more of said channels to control the extent and/or direction of gas flow.

3. The device according to claim 2 which additionally comprises a sensor-based control system to control the inflow and outflow of gases from the chamber.

4. The device according to claim 1 which includes one or more fans to assist in the gas flow.

5. The device according to claim 1 which includes an additional inlet channel for feeding one or more additional gases into the chamber.

6. The device according to claim 5 wherein the one or more additional gases comprise ethylene.

7. The device according to claim 6 wherein the produce comprises bananas.

8. The device according to claim 7 wherein the membrane is selectively permeable to gases selected from oxygen, carbon dioxide and mixtures thereof.

9. The device according to claim 1 wherein the container for shipping and storage of produce and the device itself comprise a single entity.

10. A container for the shipping and storage of produce which contains produce and is connected to the device according to claim 1, the device being located outside of the container for the shipping and storage of produce, the device not containing any produce, the gas-permeable membrane of said device being in direct contact with the atmosphere which surrounds both the container for shipping and storage of produce and the device, the interior of the container being connected to the interior of said device by said two channels, such that gases flow from the device to the container through one of said channels, and gases flow from the container to the device through the second of said channels.

11. The container according to claim 10 which additionally comprises a sensor-based control system to control the inflow and outflow gases from the chamber, and values in said channels to control the extent and direction of gas flow.

12. The method of providing a defined composition of the gas medium in a container for shipping and storage of produce, utilizing the device according to claim 11, comprising measuring the composition of the gas medium in the container, comparing the measured composition against a defined composition for the gas medium, controlling the flow of gases from the chamber to the container and/or from the container to the chamber, and repeating the measuring, comparing and controlling steps until the measured composition in the container matches the defined composition.

13. A device for shipping and storage of produce in a controlled atmospheric environment consisting essentially of a container for holding said produce; a chamber located outside of and attached to said container, wherein the content of said chamber is at substantially atmospheric pressure and does not hold said produce, a portion of the wall of said chamber made up of a selectively gas-permeable membrane which is in communication with the atmosphere which surrounds both the device and the container for shipping and storage of produce, wherein said membrane controls the identity and ratio of gases passing through it into the chamber; and at least two channels between said container and said chamber; one of which acts to transmit gases for the chamber to the container, and one of which acts to transmit gases from the container to the chamber.

\* \* \* \* \*